(12) United States Patent
Mori

(10) Patent No.: US 11,609,720 B2
(45) Date of Patent: Mar. 21, 2023

(54) IMAGE FORMING APPARATUS, NON-TRANSITORY COMPUTER READABLE MEDIUM, AND IMAGE FORMING METHOD

(71) Applicant: FUJIFILM BUSINESS INNOVATION CORP., Tokyo (JP)

(72) Inventor: Kenji Mori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/387,790

(22) Filed: Jul. 28, 2021

(65) Prior Publication Data

US 2022/0291878 A1 Sep. 15, 2022

(30) Foreign Application Priority Data

Mar. 10, 2021 (JP) .............................. JP2021-038402

(51) Int. Cl.
*G06F 3/12* (2006.01)

(52) U.S. Cl.
CPC ............ *G06F 3/1205* (2013.01); *G06F 3/126* (2013.01); *G06F 3/1286* (2013.01)

(58) Field of Classification Search
CPC combination set(s) only.
See application file for complete search history.

(56) References Cited

U.S. PATENT DOCUMENTS

| 2009/0231609 | A1* | 9/2009 | Chipchase | ............ | G06F 3/1273 |
| | | | | | 358/1.15 |
| 2011/0069330 | A1* | 3/2011 | Tanaka | ................... | G03G 15/50 |
| | | | | | 358/1.9 |
| 2012/0229833 | A1 | 9/2012 | Nakagawa | | |
| 2015/0092221 | A1* | 4/2015 | Ochi | ..................... | G06F 3/1261 |
| | | | | | 358/1.14 |
| 2018/0032298 | A1* | 2/2018 | Murata | ................. | G06F 3/1226 |
| 2018/0165045 | A1* | 6/2018 | Hagiwara | ............ | H04N 1/4413 |
| 2021/0064865 | A1* | 3/2021 | Rimchala | ............ | G06V 30/412 |

FOREIGN PATENT DOCUMENTS

| JP | 2011-049608 A | | 3/2011 |
| JP | 2011-084066 A | | 4/2011 |
| JP | 2012111136 A | * | 6/2012 |
| JP | 2012-185748 A | | 9/2012 |
| JP | 2018-018318 A | | 2/2018 |

\* cited by examiner

*Primary Examiner* — Helen Zong
(74) *Attorney, Agent, or Firm* — Oliff PLC

(57) ABSTRACT

An image forming apparatus includes: a processor configured to: acquire, from a print job, identification information that has been preset for a particular image forming apparatus in order to distinguish the particular image forming apparatus from plural image forming apparatuses connected to a network; acquire, from the particular image forming apparatus, user setting information that has been specified during instructing printing of the print job among pieces of user setting information that have been preset by a user for the particular image forming apparatus, information on settings to be used in printing being defined in the pieces of user setting information; and when it is possible to perform the printing with the settings defined in the specified user setting information, enable execution of the print job.

20 Claims, 5 Drawing Sheets

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2021-038402 filed Mar. 10, 2021.

BACKGROUND

(i) Technical Field

The present disclosure relates to an image forming apparatus, a non-transitory computer readable medium, and an image forming method.

(ii) Related Art

JP-A-2011-84066 discloses an image forming apparatus that performs printing based on a print job. The image forming apparatus includes: a determination unit that determines whether a medium setting included in setting information of an input print job is a standard medium setting that uses standard medium or a custom medium setting that uses a custom medium different from the standard medium; a conversion unit that, when the determination unit determines that the medium setting is the custom medium setting, converts the medium setting into a medium setting with which another image forming apparatus can perform printing; and a storage unit that stores the medium setting converted by the conversion unit.

JP-A-2012-185748 discloses an information processing apparatus connected to a print server. The information processing apparatus includes a printer driver for generating a print job of an intermediate data format independent of a printing apparatus of a specific model. The information processing apparatus includes: a registration unit that registers, in a storage unit, sheet information defined in advance by a user as a user-registered sheet; a first acquisition unit that acquires the sheet information from print setting information of the print job; a setting unit that, when the user-registered sheet is specified in the sheet information acquired by the first acquisition unit, acquires information on the user-registered sheet from the storage unit, and sets the information on the user-registered sheet in the print setting information of the print job; and a transmitter that transmits, to the print server, the print job including the print setting information in which the information on the user-registered sheet has been set by the setting unit.

JP-A-2018-18318 discloses an image forming apparatus. The image forming apparatus set as a slave unit is applied to a printing system including a user terminal and multiple image forming apparatuses which are connected to a network. A print service is available on the print system. In the print service, the user terminal transmits a print job to a master unit based on identification information of an image forming apparatus set as the master unit among the multiple image forming apparatuses, the master unit stores the print job from the user terminal, the image forming apparatus set as the slave unit, among the multiple image forming apparatuses, executes the print job stored in the master unit. The image forming apparatus includes an identification information setting storage that stores the identification information of the master unit, and an identification information transmission controller that transmits the identification information stored in the identification information setting storage to the user terminal when the print service is used.

SUMMARY

An image forming system has been proposed that, after a user transmits a print job for printing, enables any image forming apparatus of multiple image forming apparatuses connected to a network to print the print job. The user may preset setting information for use in printing for, for example, a particular image forming apparatus that is frequently used among the multiple image forming apparatuses. Even in this case, the user can execute the print job on another image forming apparatus different from the particular image forming apparatus. When the print job is executed by another image forming apparatus, the print job may be executed with a setting not expected by the user because the above setting information has not been preset in another image forming apparatus.

Aspects of non-limiting embodiments of the present disclosure relate to an image forming apparatus, a non-transitory computer readable medium, and an image forming method that can use user setting information that has been set by a user in different image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a processor configured to: acquire, from a print job, identification information that has been preset for a particular image forming apparatus in order to distinguish the particular image forming apparatus from plural image forming apparatuses connected to a network; acquire, from the particular image forming apparatus, user setting information that has been specified during instructing printing of the print job among pieces of user setting information that have been preset by a user for the particular image forming apparatus, information on settings to be used in printing being defined in the pieces of user setting information; and when it is possible to perform the printing with the settings defined in the specified user setting information, enable execution of the print job.

BRIEF DESCRIPTION OF THE DRAWINGS

Exemplary embodiment(s) of the present disclosure will be described in detail based on the following figures, wherein.

DETAILED DESCRIPTION

Exemplary Embodiment

Figure 1:
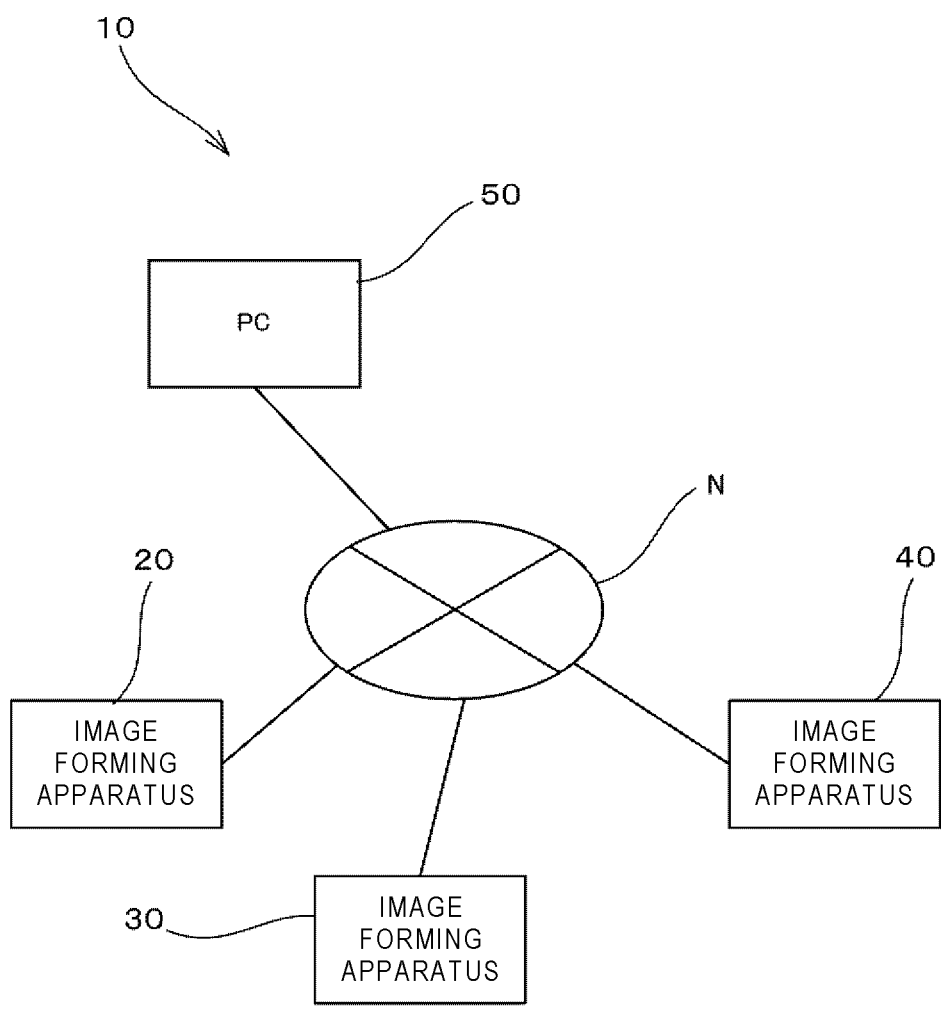
FIG. 1 is a schematic configuration diagram showing an image forming system according to an exemplary embodiment of the present disclosure.

Hereinafter, an example of an exemplary embodiment of the present disclosure will be described with reference to the accompanying drawings. The same reference signs are given to the same or equivalent elements and parts in each drawing. Dimensional ratios in the drawings are exaggerated for convenience of description and may differ from the actual ratios.

An example of an image forming system 10 according to the present exemplary embodiment will be described with reference to FIG. 1.

FIG. 1 is a diagram showing an example of a schematic configuration of the image forming system 10 according to the present exemplary embodiment.

As shown in FIG. 1, in the image forming system 10 according to the present exemplary embodiment, multiple image forming apparatuses 20, 30, and 40 are connected to each other via a network N. For example, a local area network (LAN), a wide area network (WAN), the Internet, or the like are applied to the network N. A personal computer (PC) 50 is connected to the image forming system 10 via the network N. Here, FIG. 1 shows an example in which one PC 50 is used. It is noted that the present disclosure is not limited thereto. Multiple PCs may be connected to the network N.

The multiple image forming apparatuses 20, 30, and 40 have various functions such as a printing function, a copying function, a facsimile function, and a scanner function.

Here, in the following description, it is assumed that one of the multiple image forming apparatuses 20, 30 and 40 (in the present exemplary embodiment, the image forming apparatus 20) is a master unit, and the other image forming apparatuses 30 and 40 have been set as slave units. The master unit is, for example, an image forming apparatus in which a print job is stored in using the printing function. The present disclosure is not limited to a case in which the print job is stored in the master unit. Alternatively, the print job may be stored in any of the slave units or may be stored in any of the image forming apparatuses. An image forming apparatus common to all users may be set as a master unit. Alternatively, different image forming apparatuses may be set as master units for respective users.

One of the multiple image forming apparatuses 20, 30, and 40 (in the present exemplary embodiment, the image forming apparatus 40) is an example of a "particular image forming apparatus". It is assumed that the user frequently uses the image forming apparatus 40. The frequently used image forming apparatus 40 is an image forming apparatus 40 selected by the user from among the multiple image forming apparatuses 20, 30, 40, for example, because the image forming apparatus 40 is located near a desk of the user. In order to distinguish the image forming apparatus 40 from the other image forming apparatuses 20 and 30 connected to the network N, identification information is set for the frequently used image forming apparatus 40. Settings of the identification information is set in a printer driver. It is noted that the present disclosure is not limited to this case. Furthermore, the present disclosure is not limited to a case where the identification information is set only for the frequently used image forming apparatus 40. Identification information may be set for all of the image forming apparatuses 20, 30, and 40 connected to the network N. The identification information is added to a print job when the user prints. According to the identification information, it is possible to identify, based on the print job, the image forming apparatus 40 which is frequently used by the user who is a sender of the print job.

Next, hardware configurations of the multiple image forming apparatuses 20, 30, and 40 will be described. Since the hardware configurations of the multiple image forming apparatuses 20, 30, and 40 are at least partially common, a common portion will be described by taking the image forming apparatus 40 (which is the example of the "particular image forming apparatus") as an example.

Figure 2:
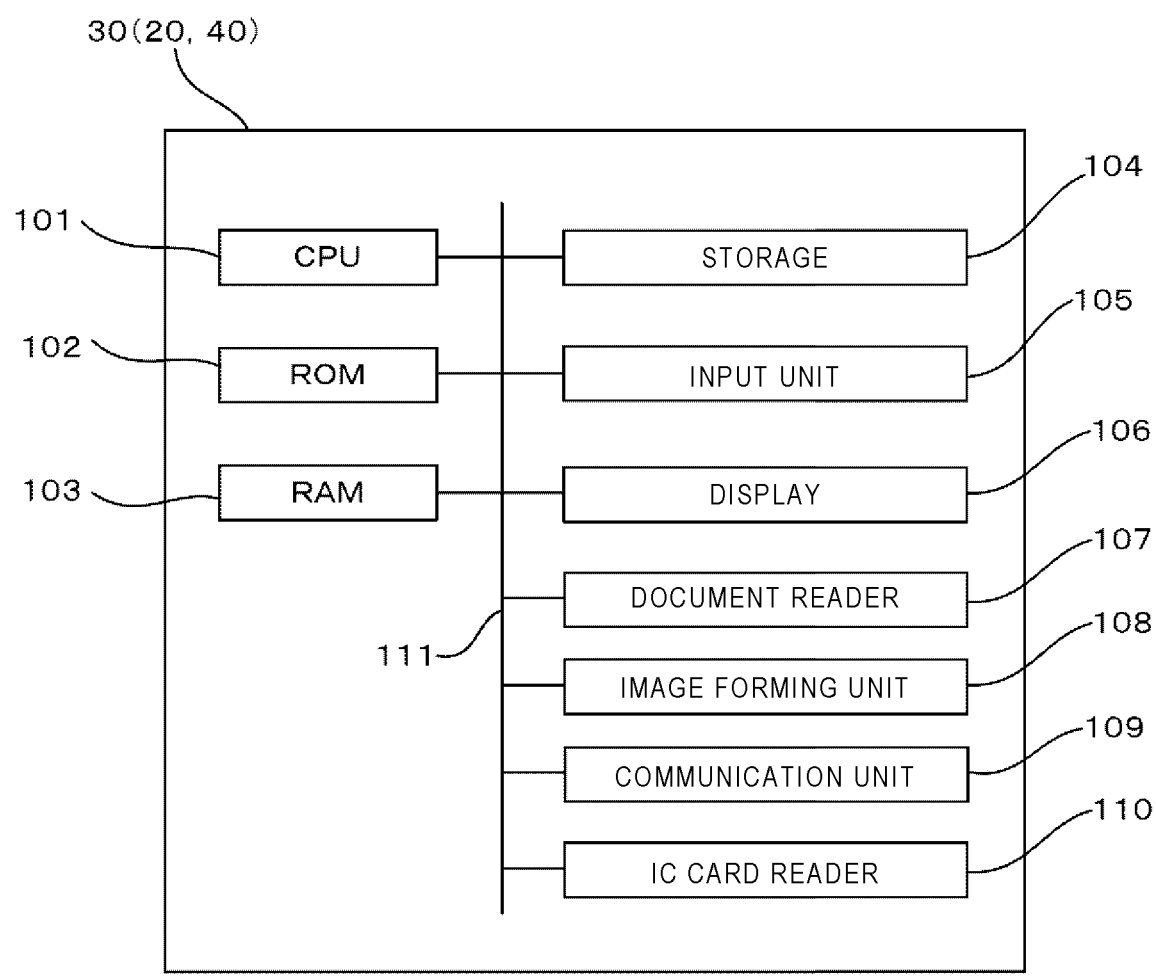
FIG. 2 is a schematic block diagram of the image forming apparatus according to the exemplary embodiment of the present disclosure.

FIG. 2 is a block diagram showing the hardware configuration of the image forming apparatus 40 according to the present exemplary embodiment.

As shown in FIG. 2, the image forming apparatus 40 includes a central processing unit (CPU) 101 that is an example of a processor, a read only memory (ROM) 102, a random access memory (RAM) 103, a storage 104, an input unit 105, a display 106, a document reader 107, an image forming unit 108, a communication unit 109, and an IC card reader 110. These units are communicably connected to each other via a bus 111.

The CPU 101 executes various programs and controls each unit. That is, the CPU 101 reads a program from the ROM 102 or the storage 104, and executes the program using the RAM 103 as a work area. The CPU 101 controls each of the units described above and performs various arithmetic processing according to the program recorded in the ROM 102 or the storage 104. In the present exemplary embodiment, the program is stored in the ROM 102 or the storage 104.

The ROM 102 stores various programs and various data. The RAM 103 temporarily stores a program or data as the work area. The storage 104 includes a hard disk drive (HDD) or a solid state drive (SSD). The storage 104 stores various programs including an operating system and various data.

The storage 104 stores user setting information that is preset by the user using the input unit 105 (which will be described later). In the user setting information, information on settings to be used in printing is defined. Here, the user setting information includes items such as "sheet type", "alignment correction", "transfer output adjustment", "registration loop amount adjustment", "transfer output adjustment on sheet edge", "sheet transport speed adjustment", "fixing temperature adjustment", and "transfer load adjustment". The user setting information is not limited to the above items. The user setting information may include other items, or may not include all the above items. For example, the "sheet type" is an item that defines a printing sheet such as a type of a sheet to use in printing and a thickness (basis weight) of a sheet. For example, a plain paper, a thick paper, a back paper, an uncoated paper, and a coated paper may be set as the type of a sheet, and a basis weight of each type may be set. The "alignment correction" is an item that corrects a squareness, a skew, a magnification, and a print position of an image to be printed on a sheet. A length by which an image is shifted in an X/Y direction may be set by mm. The "transfer output adjustment" is an item that adjusts an optimum transfer voltage. A load voltage ratio may be set for each of a front surface and a back surface. The "registration loop amount adjustment" is an item that adjusts wrinkle or bent of a sheet. The "transfer output adjustment on sheet edge" is an item that improves density unevenness at a sheet rear edge in printing on a thick paper. A value of the transfer output adjustment and a value of the transfer output adjustment at the sheet rear edge may be set to decrease in a stepwise manner. The "sheet transport speed adjustment" is an item that adjusts a fixing speed of a sheet. The fixing speed may be set in, for example, 10 steps. The "fixing temperature adjustment" is an item that finely adjusts a fixing performance according to a fixing temperature. A temperature may be increased or decreased from a standard temperature. The present disclosure is not limited to a case where the user setting information is set using the input unit 105. The user setting information may be set using the PC 50 connected to the network N.

Multiple pieces of user setting information may be registered. In this case, names with serial numbers such as "user setting information 1", "user setting information 2", and "user setting information 3" are assigned to the respective user setting information for storage. When performing printing is performed using the user setting information, the user specifies user setting information that he/she wants to use from the multiple pieces of stored user setting information and instructs the printing. It is possible to print without using any user setting information. A name other than a name with a serial number (such as the user setting information 1) may be assigned to user setting information. For example, a name reflecting a content of settings such as "A4 and Coated Paper" may be assigned.

The input unit 105 includes a pointing device such as a mouse, and a keyboard. The user uses the input unit 105 to make various inputs. The user uses the input unit 105 to execute a function, for example, to input an instruction to start printing, as will be described later. In the present exemplary embodiment, a touch panel display 106 serves as the input unit 105.

The display 106 is, for example, a liquid crystal display. The display 106 displays various information under control of the CPU 101. The display 106 adopts a touch panel and also serves as the input unit 105.

The document reader 107 transports documents placed on a sheet feed table of an automatic document feeder (not shown) provided at an upper part of the image forming apparatus 40 one by one, and optically reads the transported documents to acquire image information. Alternatively, the document reader 107 optically reads a document placed on a table such as platen glass to acquire image information.

Here, the image information of the documents read by the document reader 107 is stored in the storage 104 of the image forming apparatus 40, printed by the image forming unit 108 to be described later, or transmitted to another image forming apparatus having a facsimile (FAX) function by the communication unit 109 to be described later.

The image forming unit 108 forms, that is, prints an image on a recording medium such as a sheet of paper, based on (i) print data included in a print job acquired from the PC 50 connected via the network N or (ii) the image information acquired by the reading operation of the document reader 107.

The communication unit 109 is connected to the network N. The communication unit 109 of the image forming apparatus 40 communicates with other apparatuses such as the other image forming apparatuses 20 and 30 and the PC 50.

The communication unit 109 connects the image forming apparatus 40 to a public line, and transmits and receives the image information acquired by the reading operation of the document reader 107 to and from another image forming apparatus having the FAX function.

The IC card reader 110 is a device that reads information stored in an integrated circuit (IC) card, for example, a user ID. The IC card reader 110 reads the information stored in the IC card, identifies the user, and then enables execution of the function of the image forming apparatus 40.

The exemplary embodiment presumes that IC cards in each of which a respective one of user IDs or the like is stored as authentication information used to authenticate users are distributed to the users of the image forming apparatus 40.

The present disclosure is not limited to a case where a user is specified by reading the IC card using the IC card reader 110. Alternatively, a user may input his/her user ID using the input unit 105 without using the IC card reader 110, so that the user who is using the image forming apparatus 40 is specified. Further alternatively, the authentication information may be registered in the image forming apparatus 40 in advance, a list of the registered authentication information may be read and displayed on the display 106, a user may select his/her authentication information from among the authentication information displayed on the display 106, so that the user is specified.

Next, an operation of the image forming system 10 will be described.

Figure 3:
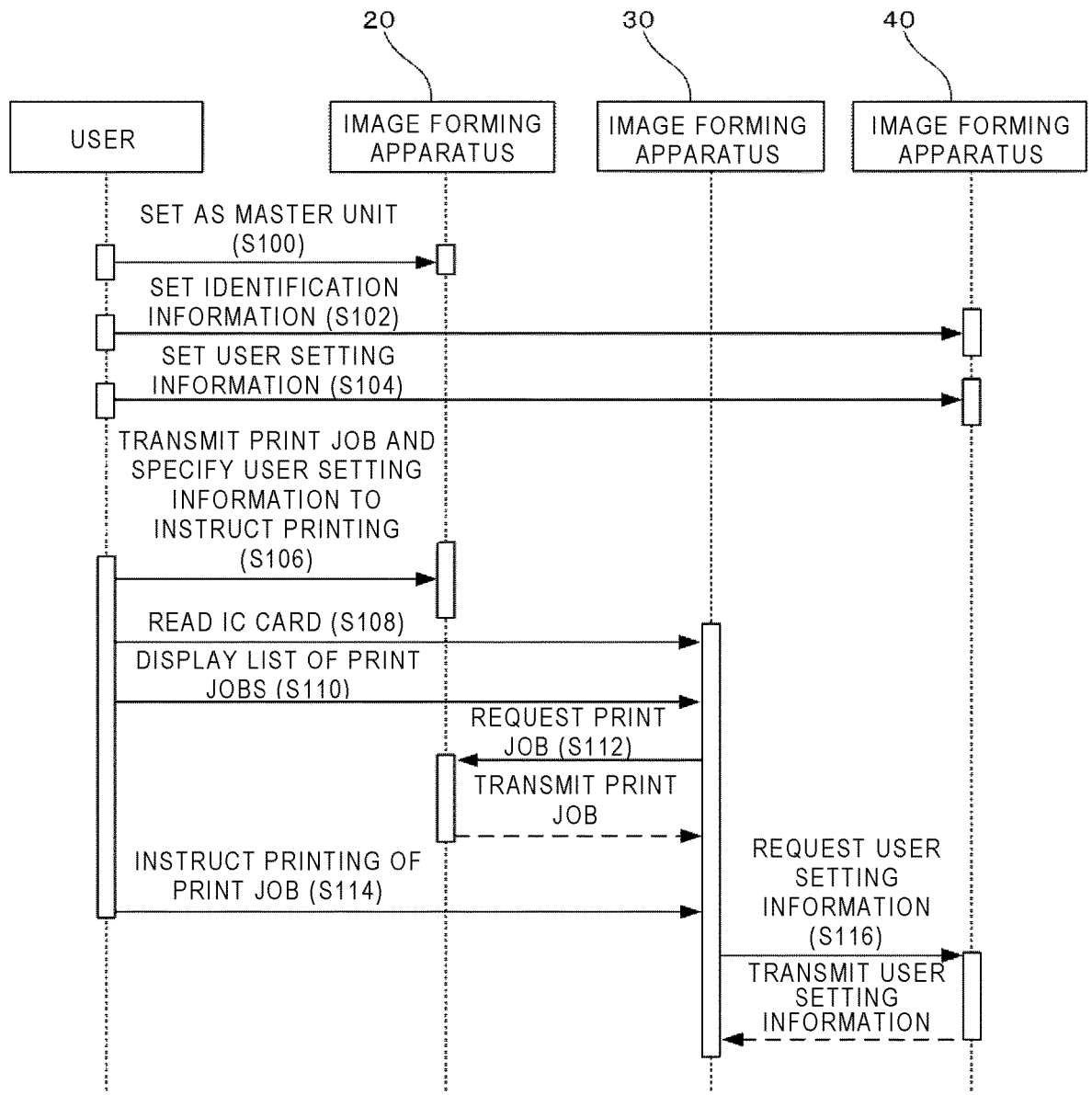
FIG. 3 is a sequence diagram showing an example of an operation of the image forming system according to the exemplary embodiment of the present disclosure.

FIG. 3 is a sequence diagram showing an example of the operation of the image forming system 10.

In step S100 shown in FIG. 3, the user accesses the image forming apparatus 20 to be set as the master unit using the PC 50 connected to the network N. Then, the user sets the image forming apparatus 20 as the master unit. The CPU 101 of the image forming apparatus 20 that has received a setting of the master unit stores master unit setting information.

Here, the present disclosure is not limited to a case in which the master unit is set using the PC 50 connected to the network N. Alternatively, the master unit may be set using the input unit 105 of the image forming apparatus 20, which is the master unit, or the input unit 105 of the image forming apparatuses 30 or 40 which is the slave unit. In the present exemplary embodiment, the image forming apparatus 30 and 40 are not explicitly set as the slave unit, and the image forming apparatuses 30 and 40 other than the master unit serve as the slave units. It is noted that the present disclosure is not limited thereto. The user may access the image forming apparatuses 30 and 40 to set the image forming apparatuses 30 and 40 as the slave units.

In step S102, the user sets identification information for distinguishing the image forming apparatus 40 from the other image forming apparatuses 20 and 30, in the frequently used image forming apparatus 40 using the PC 50 connected to the network N. Here, the present disclosure is not limited to a case where the identification information is set using the PC 50 connected to the network N. Alternatively, the identification information may be set using the input unit 105 of the image forming apparatus 40 or the input unit 105 of the other image forming apparatuses 20 or 40. The setting of the master unit in step S100 and the setting of the identification information in step S102 may be performed in a reverse order or simultaneously.

In step S104, the user sets user setting information in the image forming apparatus 40 using the input unit 105 of the image forming apparatus 40.

In step S106, the user transmits a print job that he/she wants to print from the PC 50 connected to the network N. When transmitting the print job, the user specifies the user setting information and instructs the printing. In the present exemplary embodiment, the print job is transmitted to the image forming apparatus 20 which is the master unit as described above. The image forming apparatus 20 that has received the print job stores the print job. The print job includes (i) the identification information for distinguishing the image forming apparatus 40 from the other image forming apparatuses 20 and 30, (ii) authentication information for authenticating the user who prints the print job, and (iii) print data. The CPUs 101 of the image forming apparatuses 20, 30 and 40 can recognize the user who has transmitted the print job and the frequently used image forming apparatus 40.

In step S108, the user causes the IC card reader 110 of the image forming apparatus 30 to read the IC card. Here, the image forming apparatus 30 which the user causes to read the IC card is an image forming apparatus installed at a place to which the user has moved from his/her own seat or the like in order to print a print job. The CPU 101 of the image forming apparatus 30 that has received the IC card performs a process of logging in the image forming apparatus 30.

In step S110, the user performs an operation of displaying a list of print jobs using the input unit 105 of the image forming apparatus 30.

In step S112, the CPU 101 of the image forming apparatus 30 requests the image forming apparatus 20 for print jobs having authentication information that match the authentication information registered in the read IC card. In response, the CPU 101 of the image forming apparatus 20 transmits the print jobs. The CPU 101 of the image forming apparatus 30 that has received the print job displays a list of the print jobs on the display 106.

In step S114, the user inputs a print instruction using the input unit 105 of the image forming apparatus 30. For example, the user selects a job to print from the displayed list of the print jobs, and operates a print execution switch.

In step S116, when the user setting information has been specified for the print job instructed to print, the CPU 101 of the image forming apparatus 30 requests the user setting information from the image forming apparatus 40 in which the identification information added to the print job has been set. Then, the CPU 101 of the image forming apparatus 40 transmits the user setting information. Then, when it is possible for the image forming apparatus 30 to perform printing with the user setting information specified for the print job for which the print instruction has been given, the CPU 101 of the image forming apparatus 30 enables execution of the print job, that is, execution of printing. Here, whether it is possible for the image forming apparatus 30 to execute printing with the user setting information depends on whether the image forming apparatus 30 instructed to perform printing supports settings defined in the user setting information. For example, a sheet type "thick paper" has been set in the user setting information. In this case, whether it is possible for the image forming apparatus 30 to execute printing with the user setting information is determined based on whether the image forming apparatus 30 can perform printing with the sheet type "thick paper".

Next, a process flow when the print job is printed using the image forming apparatuses 20, 30, and 40 will be described with reference to FIGS. 4 and 5. In the exemplary embodiment, a case where a user moves to an installation place of the image forming apparatus 30 and instructs the printing using the image forming apparatus 30 will be described. It is noted that the present disclosure is not limited to this case. The user may move to an installation place of the image forming apparatus 20 which has been set as the master unit and instruct the printing using the image forming apparatus 20.

Figure 4:
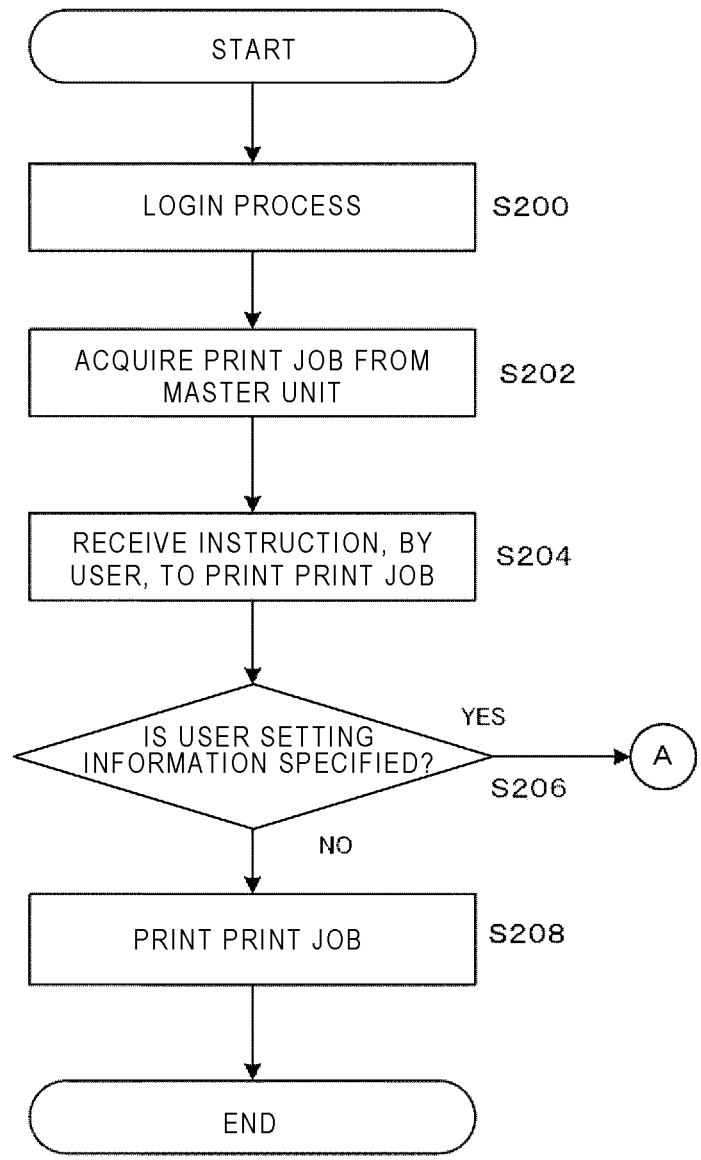
FIG. 4 is a flowchart of an example of the operation of the image forming apparatus according to the exemplary embodiment of the present disclosure.
Figure 5:
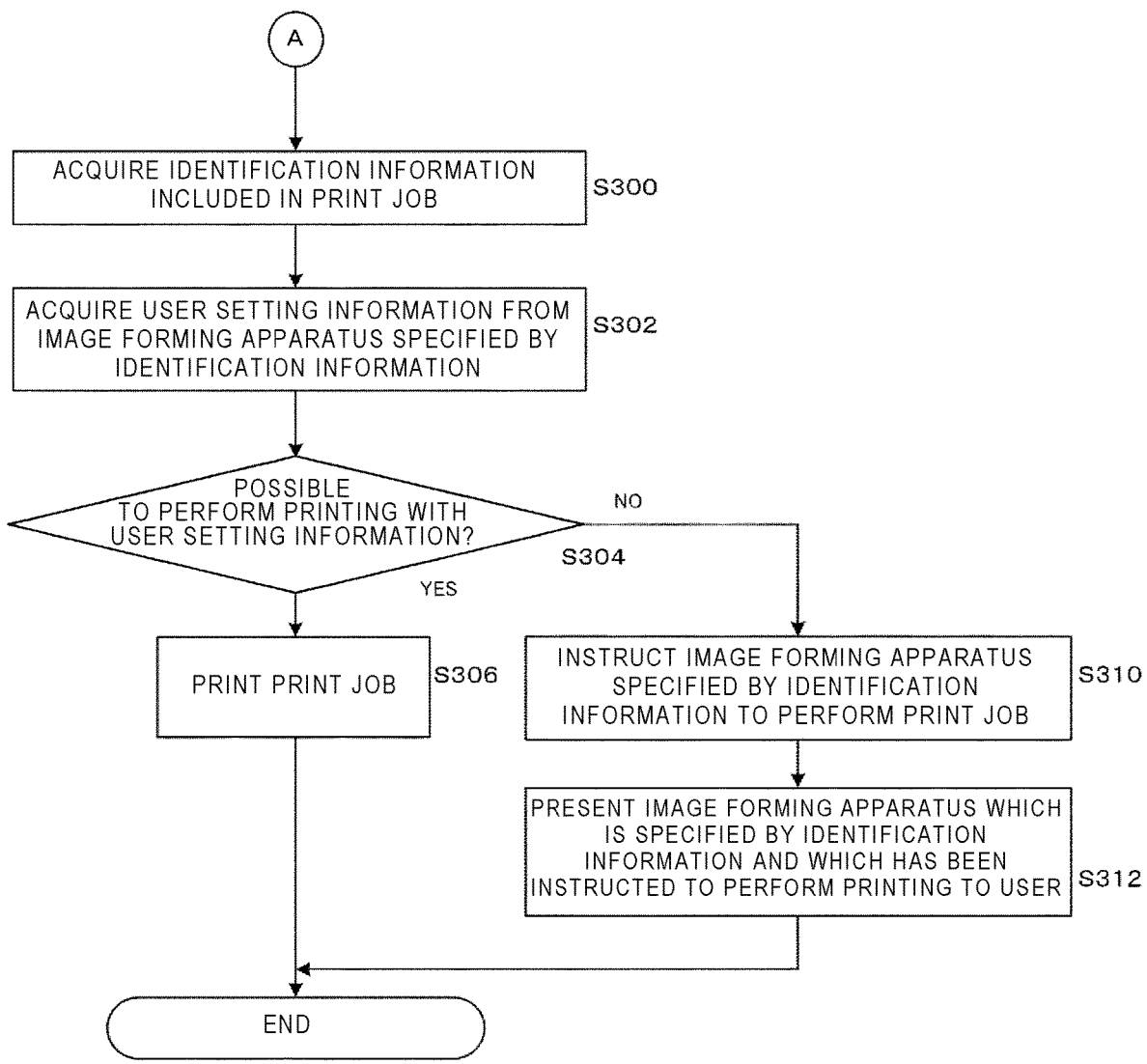
FIG. 5 is a flowchart of the example of the operation of the image forming apparatus following FIG. 4.

In step S200 shown in FIG. 4, upon the user causing the IC card reader 110 of the image forming apparatus 30, which is the slave unit, to read the IC card, the CPU 101 of the image forming apparatus 30 performs a login process for the user. Then, the flowchart proceeds to the next step S202.

In step S202, the CPU 101 of the image forming apparatus 30 acquires, from the image forming apparatus 20, which is the master unit in which print jobs are stored, print jobs having authentication information that match authentication information registered in the read IC card. When the image forming apparatus which the user has caused to read the IC card is the image forming apparatus 20 which has been set as the master unit, such a process is not performed. Then, the flowchart proceeds to the next step S204.

In step S204, the CPU 101 of the image forming apparatus 30 receives a selection, by the user, of a print job that he/she wants to print and also receives an instruction to print the selected print job. Specifically, the CPU 101 of the image forming apparatus 30 receives (i) a selection, by the user using the input unit 105, of a print job from the list of print jobs displayed on the display 106 and (ii) a signal indicating that the user operates a print execution switch. Then, the flowchart proceeds to the next step S206.

In step S206, the CPU 101 of the image forming apparatus 30 determines whether user setting information has been specified for the print job for which the print instruction has been given. When it is not determined that the user setting information has been specified, the flowchart proceeds to the next step S208.

In step S208, the CPU 101 of the image forming apparatus 30 executes the printing of the print job, that is, forms an image on a sheet. Then, the process ends.

On the other hand, when it is determined in step S206 that the user setting information has been specified, the flowchart proceeds to the next step S300.

In step S300, the CPU 101 of the image forming apparatus 30 acquires identification information included in the print job. Then, the flowchart proceeds to the next step S302.

In step S302, the CPU 101 of the image forming apparatus 30 acquires the user setting information from the image forming apparatus 40 specified by the identification information. Then, the flowchart proceeds to the next step S304.

In step S304, the CPU 101 of the image forming apparatus 30 determines whether it is possible to perform printing with settings defined in the acquired user setting information. When it is determined that it is possible to perform printing with the acquired user setting information, the flowchart proceeds to the next step S306.

In step S306, the CPU 101 of the image forming apparatus 30 executes the printing of the print job with the acquired user setting information. In executing such printing, the acquired user setting information is used as user setting information for the image forming apparatus 30 only during printing of the print job. Then, the process ends.

On the other hand, in step S304, when it is not determined that it is possible to perform printing with the settings defined in the acquired user setting information, that is, it is determined that it is not possible to perform printing with the settings defined in the acquired user setting information, the flowchart proceeds to the next step S310.

In step S310, the CPU 101 of the image forming apparatus 30 instructs the image forming apparatus 40 specified by the identification information to perform the print job that the image forming apparatus 30 cannot print. The instructing the image forming apparatus 40 to perform the print job includes transmitting the print job to the image forming apparatus 40 specified by the identification information, and executing the printing by the image forming apparatus 40 specified by the identification information. When the print job is transmitted to the image forming apparatus 40 specified by the identification information, the login process (see step S200 in FIG. 4) is performed after the user moves to the installation place of the specified image forming apparatus 40, and the printing is executed (see step S208 in FIG. 4). Alternatively, in executing the printing by the image forming apparatus 40 specified by the identification information, the printing may be executed by the image forming apparatus 40 specified by the identification information without going through the login process by the user. Then, the flowchart proceeds to the next step S312.

In step S312, the image forming apparatus 40, which is specified by the identification information and which has been instructed to perform printing in step S310, is presented to the user. That is, a message such as "A job has been transmitted to . . . " is displayed on the display 106 to prompt the user to move to the installation place of the image forming apparatus 40. Then, the process ends.

Even if it is not possible for the image forming apparatus 30 to print the print job with the user setting information, the CPU 101 of the image forming apparatus 30 may further receive an instruction to continue the printing with printable settings. Then, in response to an operation by the user, the image forming apparatus 30 may execute the printing. That is, when a sheet type with which it is not possible for the image forming apparatus 30 to perform printing has been set in the user setting information, for example, when thick paper has been set as the sheet type, the image forming apparatus 30 may become ready to perform printing with printable settings, for example, using plain paper.

When it is not possible for the image forming apparatus 30 to print the print job with the user setting information, the CPU 101 of the image forming apparatus 30 may cancel the print instruction by the user and stop the printing. In this case, the CPU 101 of the image forming apparatus 30 may notify the user that the printing has been stopped. The user who has been notified that the printing has been stopped is to transmit the print job again, and instructs the image forming apparatus 40 specified by the identification information to perform printing.

Modifications

The present disclosure is not limited to the above-described exemplary embodiment. Various modifications and changes may be made without departing from the gist of the present disclosure.

In the above-described exemplary embodiment, when receiving input of authentication information by a user, the CPU 101 of the image forming apparatus 30 receives a print job matching the authentication information from the image forming apparatus 20, which is the master unit and stores the print job, and acquires identification information from the print job. Alternatively, when receiving the input of the authentication information by the user, the CPU 101 may connect to the image forming apparatus 20, which is the master unit and stores the print job, and acquire the identification information from the print job matching the authentication information. That is, the CPU 101 is configured not to receive print data included in the print job before determining whether it is possible to perform printing with the user setting information. Then, when it is determined that it is possible to perform printing, the CPU 101 acquires the print data included in the print job. With this configuration, when it is determined that it is not possible to perform printing, the CPU 101 does not acquire the print data, so that an amount of data transmitted and received can be reduced.

When the user prints multiple print jobs, the multiple print jobs are transmitted to the image forming apparatus 20, which is the master unit. It is assumed that the multiple print jobs include a particular print job and that it is not possible for the image forming apparatus 30 to perform printing with user setting information that has been specified for the particular print job. In this case, the CPU 101 of the image forming apparatus 30 instructs the image forming apparatus 40 specified by the identification information to print all the print jobs including the particular print job. Alternatively, the image forming apparatus 30 may simply print the print jobs other than the particular job, that is, print the print jobs for which user setting information is specified with which it is possible for the image forming apparatus 30 to perform printing, and may instruct the image forming apparatus 40 specified by the identification information to print the particular print job.

Information on settings that the multiple image forming apparatuses 20, 30, and 40 connected to the network N can use may be stored in advance in the master unit or the like. The CPU 101 of the master unit may determine whether it is possible for an image forming apparatus which the user has logged in to perform printing with the user setting information, and display a determination result in a list of print jobs displayed on the display 106 of the image forming apparatus which the user has logged in.

The above exemplary embodiment has described a case in which a program is stored (installed) in the ROM 102 or the storage unit (storage) 104 in advance. It is noted that the present disclosure is not limited thereto. The program may be provided in a form recorded in a recording medium such as a compact disk read only memory (CD-ROM), a digital versatile disk read only memory (DVD-ROM), and a universal serial bus (USB) memory. Further, the program may be downloaded from an external apparatus via the network N.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A first image forming apparatus comprising:
a processor configured to:
receive a transmission of a print job;
acquire, from the print job, identification information that has been preset upon being added to the print job by a user during instructing printing of the print job, the identification information being for a second image forming apparatus in order to distinguish the second image forming apparatus from a plurality of image forming apparatuses connected to a network,
wherein the print job includes: (i) the identification information for distinguishing the second image forming apparatus from the plurality of image forming apparatuses; (ii) authentication information for authenticating the user who prints the print job; and (iii) print data;
acquire, from the second image forming apparatus, user setting information that has been specified during instructing printing of the print job among pieces of user setting information that have been preset by a user for the second image forming apparatus, information on settings to be used in printing being defined in the pieces of user setting information;
determine whether it is possible to perform printing on the first image forming apparatus that has acquired the user setting information;
when a determination is made that it is possible to perform the printing of the print job with the settings defined in the specified user setting information, enable execution of the print job on the first image forming apparatus; and
when a determination is made that it is not possible to perform the printing of the print job with the settings defined in the specified user setting information, transfer the print job to the second image forming apparatus,
wherein the processor is configured to not receive the print data included in the print job before determining whether it is possible to perform printing with the user setting information.

2. The first image forming apparatus according to claim 1, wherein
the processor is configured to:
when it is not possible to perform the printing with the settings defined in the specified user setting information, instruct the second image forming apparatus to perform the printing.

3. The first image forming apparatus according to claim 1, wherein
the processor is configured to:
when it is not possible to perform the printing with the settings defined in the specified user setting information, be ready to receive an instruction to continue the printing with printable settings.

4. The first image forming apparatus according to claim 2, wherein
the processor is configured to:
when it is not possible to perform the printing with the settings defined in the specified user setting information, be ready to receive an instruction to continue the printing with printable settings.

5. The first image forming apparatus according to claim 1, wherein the user setting information comprises information on settings related to a printing sheet.

6. The first image forming apparatus according to claim 2, wherein the user setting information comprises information on settings related to a printing sheet.

7. The first image forming apparatus according to claim 3, wherein the user setting information comprises information on settings related to a printing sheet.

8. The first image forming apparatus according to claim 4, wherein the user setting information comprises information on settings related to a printing sheet.

9. The first image forming apparatus according to claim 1, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

10. The first image forming apparatus according to claim 2, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

11. The first image forming apparatus according to claim 3, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

12. The first image forming apparatus according to claim 4, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

13. The first image forming apparatus according to claim 5, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

14. The first image forming apparatus according to claim 6, wherein
the print job comprises the identification information, authentication information for authenticating the user who prints the print job, and print data, and
the processor is configured to:

upon receipt of input of the authentication information by the user, receive the print job matching the authentication information from an image forming apparatus that stores the print job among the plurality of image forming apparatuses, and acquire the identification information from the print job.

15. The first image forming apparatus according to claim 7, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

16. The first image forming apparatus according to claim 8, wherein
the print job comprises the identification information, authentication information for authenticating the user who prints the print job, and print data, and
the processor is configured to:
upon receipt of input of the authentication information by the user, receive the print job matching the authentication information from an image forming apparatus that stores the print job among the plurality of image forming apparatuses, and acquire the identification information from the print job.

17. The first image forming apparatus according to claim 1, wherein
the print job comprises the identification information, authentication information for authenticating the user who prints the print job, and print data, and
the processor is configured to:
upon receipt of input of the authentication information by the user, connect to an image forming apparatus that stores the print job among the plurality of image forming apparatuses, and acquire the identification information from the print job matching the authentication information.

18. The first image forming apparatus according to claim 17, wherein
the processor is configured to:
when determining that it is possible to perform the printing with the settings defined in the specified user setting information, acquire the print data included in the print job.

19. A non-transitory computer readable medium storing a program that causes a computer to execute information processing on a first image forming apparatus, the information processing comprising:
receiving a transmission of a print job;
acquiring, from the print job, identification information that has been preset upon being added to the print job by a user during instructing printing of the print job, the identification information being for a second image forming apparatus in order to distinguish the second image forming apparatus from a plurality of image forming apparatuses connected to a network;
wherein the print job includes: (i) the identification information for distinguishing the second image forming apparatus from the plurality of image forming apparatuses; (ii) authentication information for authenticating the user who prints the print job; and (iii) print data;
acquiring, from the second image forming apparatus, user setting information that has been specified during instructing printing of the print job among pieces of user setting information that have been preset by a user for the second image forming apparatus, information on settings to be used in printing being defined in the pieces of user setting information;
determining whether it is possible to perform printing on the first image forming apparatus associated with the computer that has acquired the user setting information;
when a determination is made that it is possible to perform the printing of the print job with the settings defined in the specified user setting information, enabling execution of the print job on the first image forming apparatus; and
when a determination is made that it is not possible to perform the printing of the print job with the settings defined in the specified user setting information, transferring the print job to the second image forming apparatus,
wherein the print data included in the print job is not received before determining whether it is possible to perform printing with the user setting information.

20. An image forming method implemented by a first image forming apparatus, the method comprising:
receiving a transmission of a print job;
acquiring, from the print job, identification information that has been preset upon being added to the print job by a user during instructing printing of the print job, the identification information being for a second image forming apparatus in order to distinguish the second image forming apparatus from a plurality of image forming apparatuses connected to a network,
wherein the print job includes: (i) the identification information for distinguishing the second image forming apparatus from the plurality of image forming apparatuses; (ii) authentication information for authenticating the user who prints the print job; and (iii) print data;
acquiring, from the second image forming apparatus, user setting information that has been specified during instructing printing of the print job among pieces of user setting information that have been preset by a user for the second image forming apparatus, information on settings to be used in printing being defined in the pieces of user setting information;
determining whether it is possible to perform printing on the first image forming apparatus that has acquired the user setting information;
when a determination is made that it is possible to perform the printing of the print job with the settings defined in the specified user setting information, enabling execution of the print job on the first image forming apparatus; and
when a determination is made that it is not possible to perform the printing of the print job with the settings defined in the specified user setting information, transferring the print job to the second image forming apparatus,
wherein the print data included in the print job is not received before determining whether it is possible to perform printing with the user setting information.

* * * * *